(12) United States Patent
Kim et al.

(10) Patent No.: US 7,437,748 B2
(45) Date of Patent: Oct. 14, 2008

(54) DISK CARTRIDGE AND DATA MEDIUM HAVING SAME

(75) Inventors: Cheol-Gyu Kim, Gwangmyeong (KR); Seung-Hon Yoo, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/406,936

(22) Filed: Apr. 3, 2003

(65) Prior Publication Data

US 2003/0193886 A1   Oct. 16, 2003

(30) Foreign Application Priority Data

Apr. 11, 2002   (KR) ...................... 10-2002-0019760

(51) Int. Cl.
*G11B 23/03*   (2006.01)
(52) U.S. Cl. ...................... 720/739; 360/133
(58) Field of Classification Search ................ 720/725, 720/728, 738, 739, 740, 743; 360/133
See application file for complete search history.

(56) References Cited

U.S. PATENT DOCUMENTS

| 4,911,301 | A |   | 3/1990  | Dieffenbach |          |
|-----------|---|---|---------|-------------|----------|
| 5,381,402 | A | * | 1/1995  | Lee et al. ..................... | 720/738 |
| 5,481,420 | A | * | 1/1996  | Cardona et al. .......... | 360/99.06 |
| 5,537,389 | A | * | 7/1996  | Kuwa et al. ................. | 720/743 |
| 5,638,241 | A | * | 6/1997  | Sonderegger .............. | 360/133 |
| 5,930,090 | A | * | 7/1999  | Schick et al. ............... | 360/133 |
| 6,118,757 | A |   | 9/2000  | Olsen et al. |          |
| 6,243,355 | B1| * | 6/2001  | Ikebe et al. ................. | 720/731 |
| 6,307,831 | B1| * | 10/2001 | Miyazaki et al. ............ | 720/728 |
| 6,411,597 | B1| * | 6/2002  | Nishino et al. .............. | 720/733 |
| 6,583,956 | B2| * | 6/2003  | Kikuchi et al. .............. | 360/133 |
| 6,614,622 | B2| * | 9/2003  | Kikuchi et al. .............. | 360/133 |
| 6,687,215 | B1| * | 2/2004  | Bagnell et al. .............. | 720/740 |
| 6,826,773 | B2| * | 11/2004 | Oishi et al. .................. | 720/739 |
| 6,965,497 | B2| * | 11/2005 | Kobayashi et al. .......... | 360/133 |
| 7,089,574 | B2| * | 8/2006  | Choi et al. ................... | 720/739 |

FOREIGN PATENT DOCUMENTS

| CN | 87105840    | 2/1988  |
| CN | 1198239     | 11/1998 |
| EP | 0 884 728 A1 | 12/1998 |
| EP | 1 081 703 A2 | 3/2001  |
| EP | 1 081 703 A3 | 5/2001  |
| JP | 61206984    | 9/1986  |
| JP | 01078478    | 3/1989  |
| WO | WO 03/009292 | 1/2003  |

* cited by examiner

*Primary Examiner*—Angel A Castro
(74) *Attorney, Agent, or Firm*—Lee, Hong, Degerman, Kang & Waimey

(57) ABSTRACT

A disk cartridge and data recording/reproducing medium are disclosed. The disk cartridge includes: a disk housing including a disk receiving unit for rotatably receiving a disk, and an opening portion formed at a portion corresponding to a hub of the disk and formed where a pickup unit for recording/reproducing data to/from the disk while being rotationally moved on the disk moves; and a shutter for opening and shutting the opening portion.

2 Claims, 6 Drawing Sheets

US 7,437,748 B2

DISK CARTRIDGE AND DATA MEDIUM HAVING SAME

CROSS-REFERENCE TO RELATED APPLICATIONS

Pursuant to 35 U.S.C. §119(a), this application claims the benefit of earlier filing date and right of priority to Korean Application No. 19760/2002, filed Apr. 11, 2002, the contents of which are herby incorporated by reference herein in their entirety.

BACKGROUND OF THE INVENTION

1. Field of the Invention

The present invention relates to a disk cartridge and data recording/reproducing medium having the same, and more particularly, to a disk cartridge that receives a disk for recording/reproducing data using a swing-arm pickup unit and a data recording/reproducing medium.

2. Description of the Background Art

Various methods exist to record/reproduce a large quantity of data. Such methods include optical, magnetic, magnetic-optical using both optics and magnetism, and the like. A recording/reproducing device using these methods record or reproduce data from a data recording medium. Typical recording mediums include a CD (Compact Disk), a DVD (Digital Video Disk), floppy disk, and an HDD (Hard Disk Drive) having an integrated recording/reproducing device.

During operation, the data medium is mounted in a mounting unit of the recording/reproducing device for recording/reproducing data to/from the data medium in order to record/reproduce data, and the data is recorded and/or reproduced onto/from the data medium by a typical pickup unit provided at the mounting unit.

In order to record/reproduce data to and from the data medium, the pickup unit moves relative to a recording surface of the data medium. Methods for moving the pickup unit include: a thread method in which the pickup unit makes linear reciprocal motion along a motion guide shaft; and a swing-arm method where the pickup unit rotates at a certain interval centering around a rotational shaft generating a rotational force.

Recording capacity has increased while the size of the data medium has decreased. Accordingly, because the data medium is susceptible to damage or corruption by exposure to a foreign material, such as dust, the recording/reproducing surface of the data medium needs to be protected from the foreign material. The data medium is used in conjunction with a disk cartridge, i.e., a disk protecting unit, for receiving the disk and for protecting the recording surface of the disk.

The structure of the disk cartridge preferably should be a structure which permits easy access of the recording surface of the disk for recording/reproducing data. In particular, in the case of a swing-arm pickup unit, the disk cartridge needs to be structured in such a manner that it does not interfere with the rotation of the swing-arm.

SUMMARY OF THE INVENTION

Therefore, an object of the present invention is to provide a disk cartridge having a structure which prevents foreign material from being introduced onto a medium, and which does not interfere with the pickup unit. A data medium having such a disk cartridge is also provided.

To achieve these and other advantages and in accordance with the purpose of the present invention, as embodied and broadly described herein, there is provided a disk cartridge including: a disk housing having a disk receiving unit for rotatably receiving a disk, and an opening portion formed at a portion corresponding to a hub of the disk and formed where a pickup unit for recording/reproducing data to/from the disk while being rotationally moved on the disk moves; and a shutter for opening and shutting the opening portion.

To achieve the above objects, there is also provided a recording medium having a disk and a disk cartridge, wherein the disk cartridge includes: a disk housing having a disk receiving unit for rotatably receiving a disk and an opening portion formed at a portion corresponding to a hub of the disk and formed where a pickup unit for recording/reproducing data to/from the disk while being rotationally moved on the disk moves; and a shutter for opening and shutting the opening portion.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Figure 1:
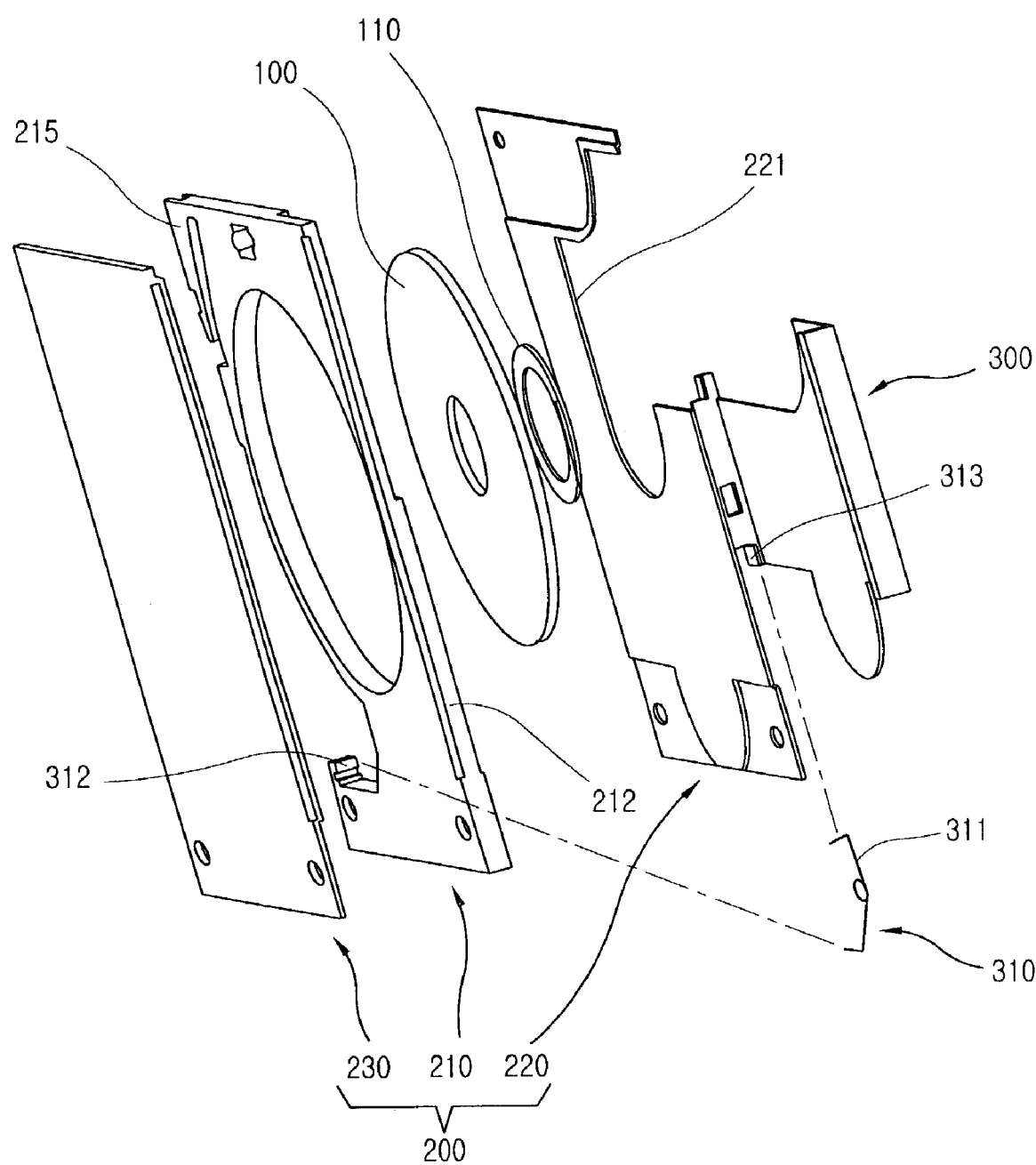
FIG. 1 is an exploded perspective view of a disk cartridge in accordance with the present invention.

Reference will now be made in detail to the preferred embodiments of the present invention, examples of which are illustrated in the accompanying drawings.

As shown in FIGS. 1 to 8, a disk cartridge includes: a disk housing 200 including a disk receiving unit 211 for rotatably receiving a disk 100 and an opening portion 221 formed at a portion corresponding to a hub 110 of the disk 100 and formed in a location where a pickup unit 400 for recording/reproducing data to/from the disk 100 while being rotationally moved on the disk 100 moves; and a shutter 300 for opening and shutting the opening portion.

The disk cartridge of the present invention is principally used for a data medium for recording/reproducing device having a pick unit which rotates, rather than one which utilizes linear reciprocal motion, to record/reproduce data on a recording surface of the received disk 100.

In the disk cartridge, the opening portion 221 is formed to open a portion where the pickup unit 400 moves, as well as exposing the hub 110 of the disk. When the pickup unit 400 is rotated, it may not be interfered with (the pickup unit is rotationally moved in a state of floating over the disk because of an air bearing effect in a ultra high density medium).

Figure 2:
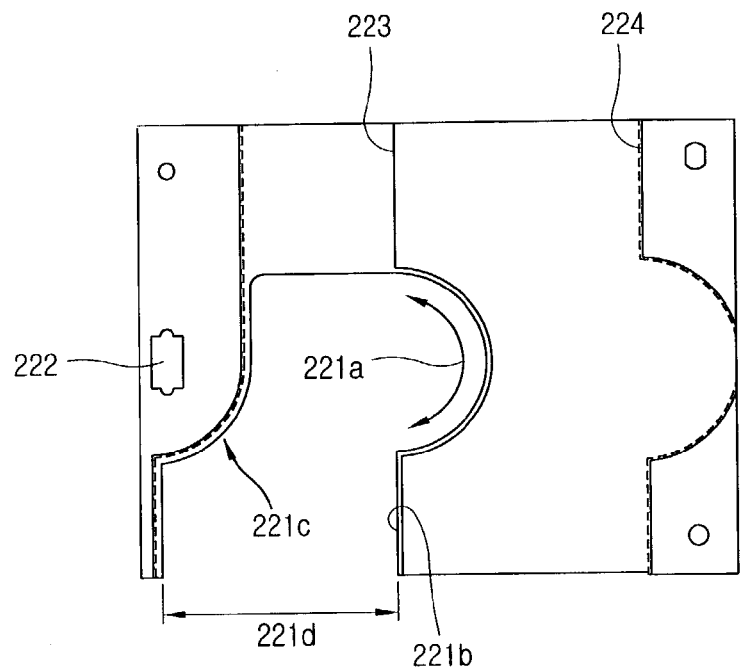
FIG. 2 is a plan view of an upper plate of the disk cartridge of FIG. 1.

As shown in FIG. 2, the opening portion 221 has an outer contour including a hub section 221a corresponding to the hub 110 of the disk 100, a linear section 221b formed from the center (O) of the disk 100 to the side of the disk cartridge facing the pickup unit 400, a moving section 221c having a proper profile so that the rotation of an end portion of the pickup unit 400 from the center (O) of the disk 100 may not be interfered, and a connection portion 221d connecting the end of the moving section 221c and the end of linear section 221b.

The data medium having a disk cartridge of the present invention may also be constructed such that the linear section 221b extends a certain distance in parallel from the center of the disk for enabling linear reciprocal motion of the pickup unit 400 so that the data medium can also be used for a data recording/reproducing device which utilizes the thread method. In addition, a data medium having the disk cartridge of the present invention can also used for a data recording/reproducing device which utilizes a swing-arm method, as well as for data recording/reproducing devices which use the thread method.

The disk 100 is rotatably received in the disk housing 200, and includes a medium having a recording surface for recording/reproducing data. Housing 200 includes: a main body 210 having an opening 211 in which the disk 100 is inserted, a lower plate 230 coupled at a lower surface of the main body 210, and an upper plate 220 coupled to an upper surface of the main body 210 and having the opening portion 221, as shown in FIG. 1.

Figure 3:
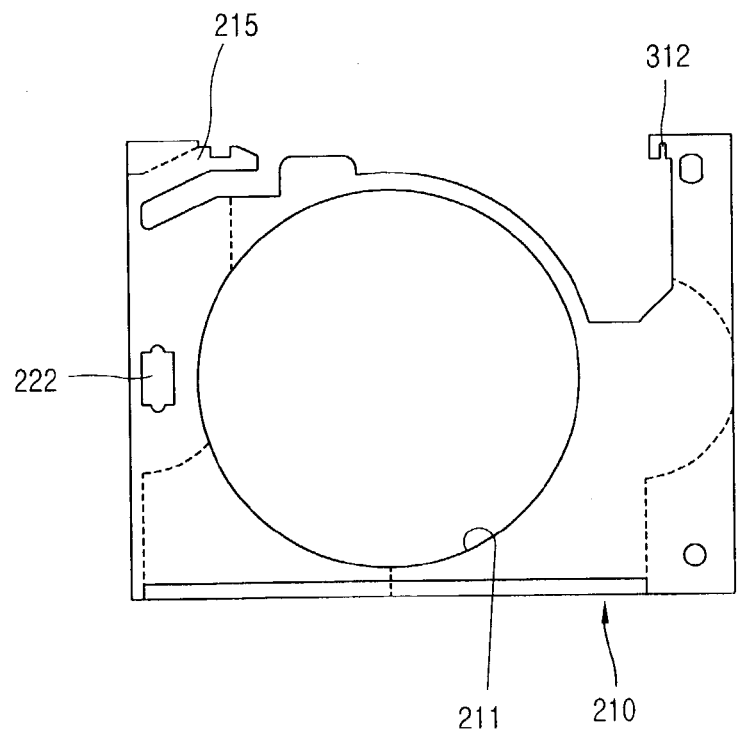
FIG. 3 is a plan view of a main body of the disk cartridge of FIG. 1.

As shown in FIGS. 1 to 3, at the side of the main body 210, a guide portion 212 is formed to guide movement of the shutter 300. Shutter opening and shutting unit 310 is installed to open and shut a shutter 300 (described in more detail below).

Preferably, the upper plate 220 has a step as thick as the shutter 300, and corresponds to a plane outer line of the shutter 300 in order for the shutter 300 to accurately guide opening and shutting positions. Reference numerals 223 and 224 in FIG. 2 denote such steps, respectively.

The main body 210, the upper plate 220 and the lower plate 230 are made of plastic by injection molding, and the main body 210 and the lower plate 230 are preferably integrally formed for reducing the fabrication processes of the disk cartridge. The disk cartridge may have an information tag unit 222 for indicating supplementary data (read only, writable, etc.) on the disk 100.

Figure 4:
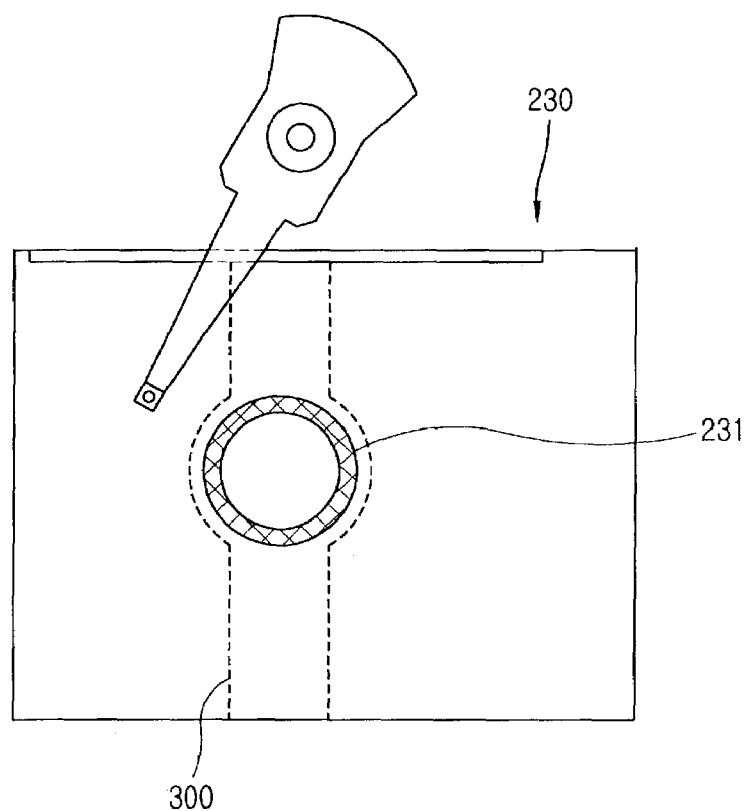
FIG. 4 is a plan view of a lower plate with an auxiliary opening hole of the disk cartridge of FIG. 1.
Figure 5:
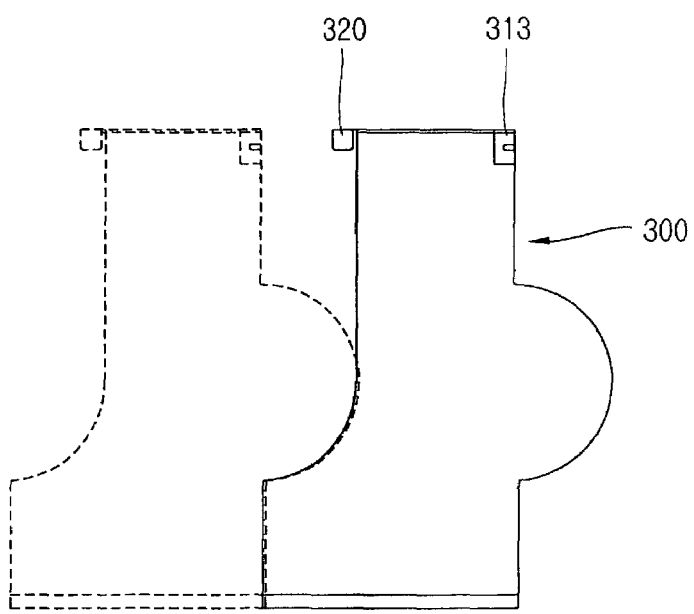
FIG. 5 is a plan view of the shutter of the disk cartridge of FIG. 1.

The hub 110 of the disk 100 is opened to rotate the disk 100 by being coupled to a rotation driving unit (not shown). As shown in FIG. 4, the disk cartridge of the present invention may additionally have an auxiliary opening portion 231 indicated as a dotted line at a portion corresponding to the hub 110 of the disk at the lower plate 230, in order to open both upper and lower sides corresponding to the hub 110 of the disk 100. Shutter 300 may also have a portion to open and shut the auxiliary opening portion 231. This allows opening portion 221 and the auxiliary opening portion to be simultaneously opened/closed.

Referring to the main body 210, the side portion corresponding to the movement section of the pickup unit 400 is preferably formed as high as the recording surface of the disk 100 so that the main body 210 may not interfere with the motion of the pickup unit 400 when the pickup unit 400 is moved in the vertical direction of the rotational shaft of the disk 100.

Figure 6:
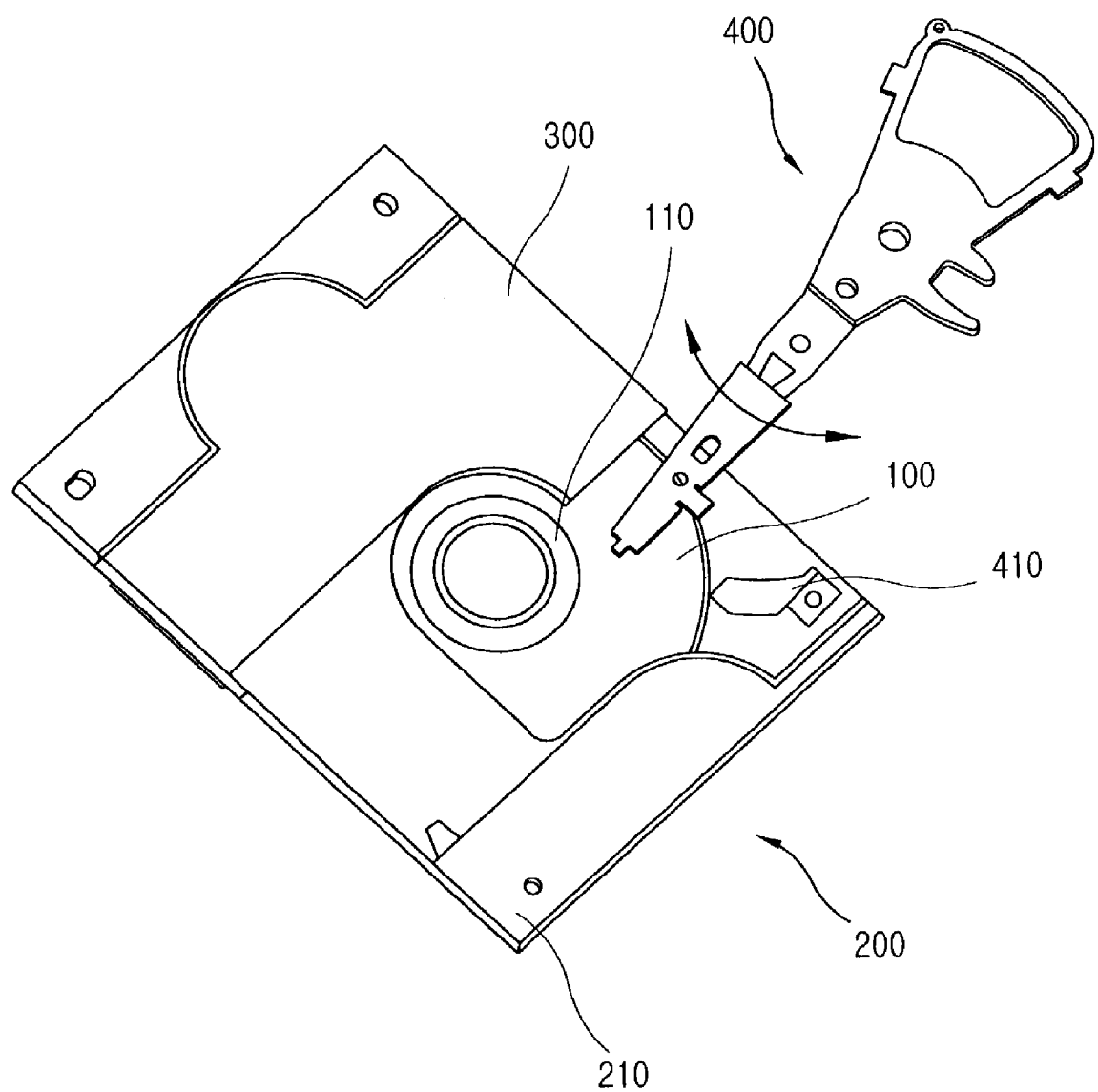
FIG. 6 is a conceptual view showing the disk cartridge of FIG. 1 mounted in the mounting unit.

The disk housing 200 may further have a head parking unit 410 to allow a head of the pickup unit 400 to park thereon. As shown in FIG. 6, the head parking unit 410 is installed at one side of the main body 410.

The shutter opening and shutting unit 310 is installed at the disk housing 200 for moving the shutter 300 by cooperating with a mounting unit (not shown) of the disk cartridge in order to open and shut the opening portion 221.

The shutter opening and shutting unit 310 includes an elastic member 311 applying a force to the shutter 300 in a direction that the opening portion 221 is opened; and an operation unit for moving the shutter 300 in an opening direction by cooperating with the mounting unit when the disk cartridge is mounted on the mounting unit.

One end of the elastic member 311 is fixed at the disk housing 200, that is, at an elastic member fixing portion 312 of the main body, and the other end thereof is fixed at the shutter 300, that is, at a protrusion portion 313. A coil spring can be used as the elastic member 311.

In the present invention, the elastic member 311 is installed to apply a force in a direction that the opening portion 221 is opened. Alternatively, the elastic member can be installed to apply a force in a direction that the opening portion 221 is shut.

Figure 8:
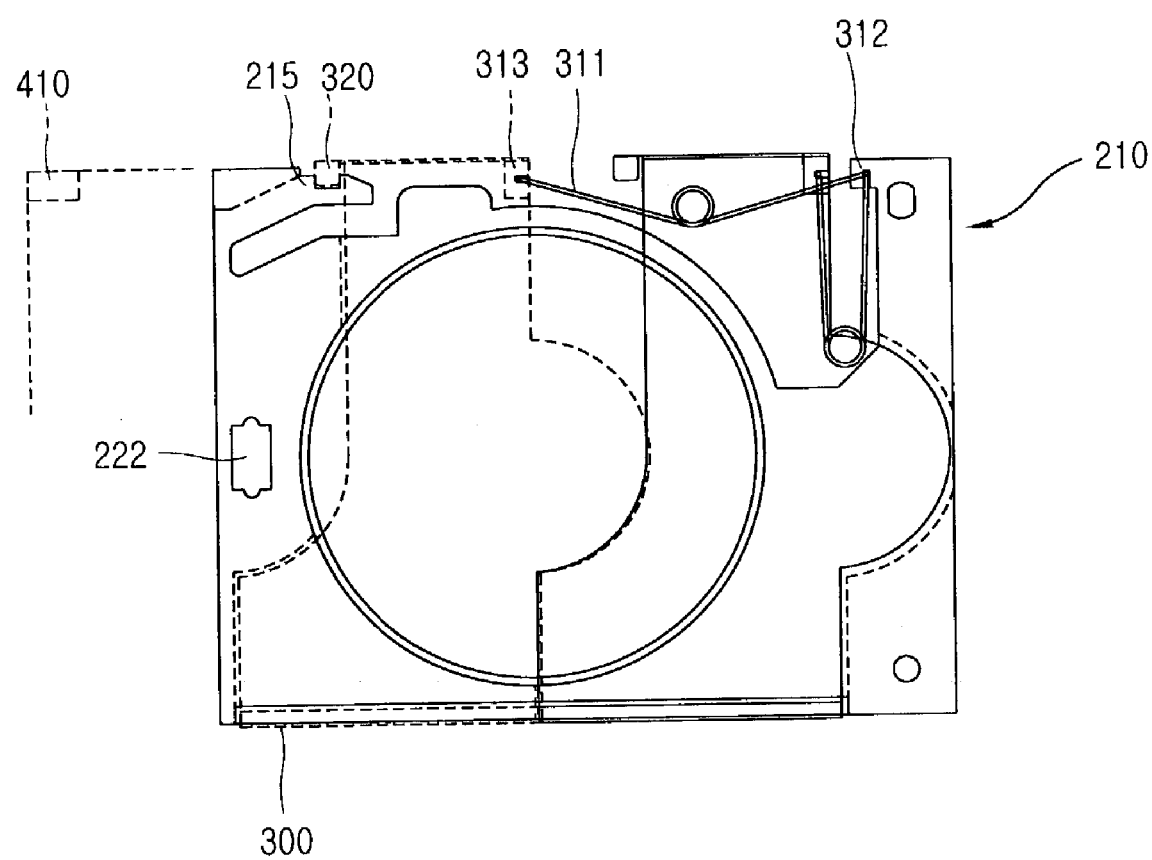
FIG. 8 is a conceptual view showing the disk cartridge with a shutter closing and opening with respect to a main body of the disk cartridge.

The operating unit can be constructed in various ways by those with ordinary skill in the art. In the present invention, as shown in FIGS. 3 and 8, the operating unit is formed as a shutter fixing hook 215 which usually fixes the shutter 300 so that it is maintained in a closing state, and cooperates with the protrusion 410 formed at the mounting unit when the disk cartridge is mounted on the mounting unit.

Fixing jaw 320 is formed at the shutter 300 so that the shutter 300 is usually maintained in the closed state as the fixing jaw 320 is hooked at the shutter fixing hook 215. Meanwhile, when the disk cartridge is mounted in the mounting unit, the shutter fixing hook 215 is pushed inwardly of the main body 210 by the protrusion portion 410 formed at the mounting unit, to release the fixing jaw 320 from the hooking state. Shutter 300 is then moved in a direction that it is opened by the elastic force of the elastic member 311.

If it is desired that the disk cartridge is to be separated from the mounting unit, a member for pushing the shutter 300 in a direction so that it is shut can be additionally installed at the mounting unit, whereby the shutter 300 can shut the opening portion 221.

The disk cartridge constructed as described above and the operation of the data medium having the disk cartridge will now be described in detail.

Figure 7:
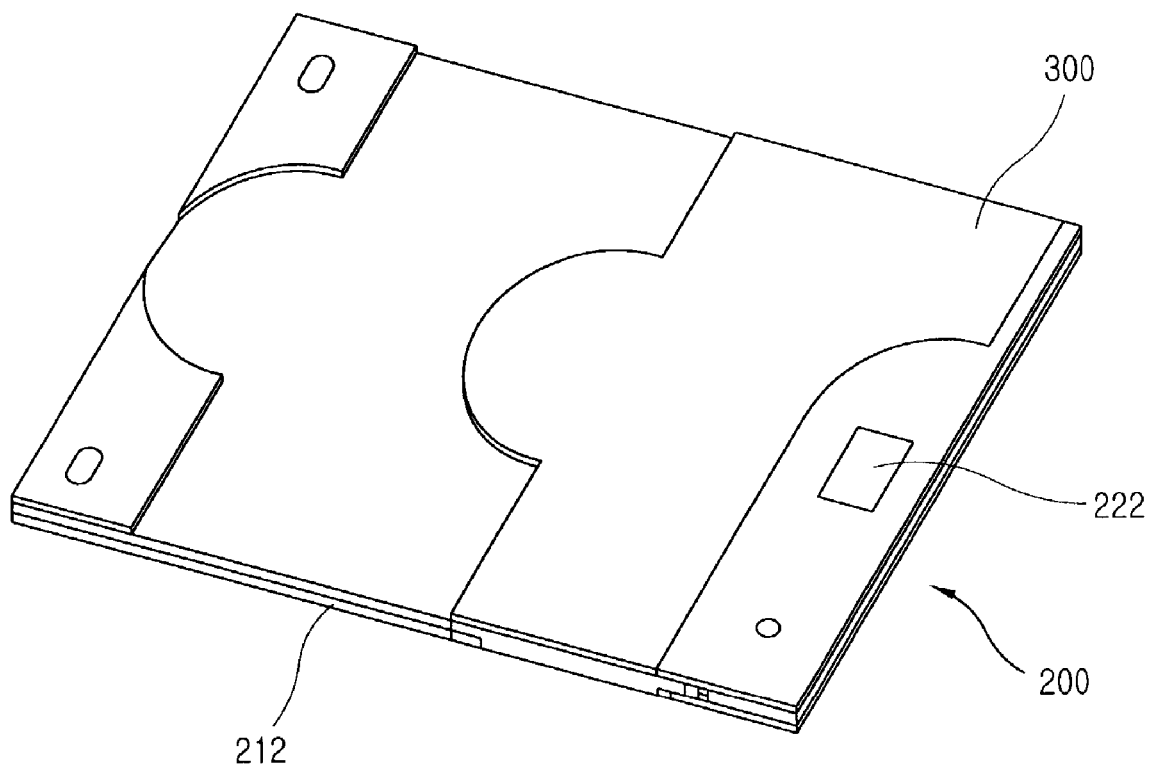
FIG. 7 is a conceptual view showing the disk cartridge with a shutter opening and shutting unit closing an opening portion.

First, in a state where the data recording/reproducing device is mounted at the mounting unit, that is, in the case that the data medium is separately kept or carried out, as shown in FIG. 7, the shutter 300 is maintained to shut the opening portion 221. Accordingly, any foreign material is prevented from being introduced into the disk cartridge, thereby protecting the disk 100.

Consider now the case in which the data medium is mounted in the mounting unit of the data recording/reproducing device. To record/reproduce data onto/from the disk 100, as shown in FIG. 6, the shutter cooperates with the mounting unit to open the opening portion 221. This action is done according to operation of the shutter opening and shutting portion 310. Accordingly, the pickup unit 400 (especially the pickup unit using the swing-arm method) is smoothly moved to record/reproduce data onto/from the disk 100.

As described, the data medium having the disk cartridge in accordance with the present invention usually prevents inflow of foreign material, while it does not interrupt movement of the pickup unit for recording/reproducing data. Moreover, the data medium having the disk cartridge in accordance with the present invention has an advantage that the opening portion is formed so that it is suitable for swing-arm pickup devices, as well as for those which utilize thread methods.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A disk cartridge comprsing:

a disk housing including:
- a main body having a disk receiving unit for rotatably receiving a disk and having an opening in which the disk is inserted;
- a lower plate coupled at a lower surface of the main body;
- an upper plate coupled to an upper surface of the main body and having an opening portion, the opening portion structured to expose at least portion of a hub of the disk, to expose a portion of the disk to enable recording/reproducing by a pickup unit, and to permit the pickup unit unobstructed access to the disk; and
- a linearly operated shutter for opening and closing the opening portion, wherein a side portion of the main body corresponding to a movement interval of the pickup unit is as high as the disk surface so that the pickup unit may not be interrupted in a vertical direction of a rotational shaft of the disk.

2. A disk cartridge comprising:

a disk housing including a disk receiving unit for rotatable receiving a disk;

an opening portion formed in the disk housing, the opening portion structured to expose at least portion of a hub of the disk, to expose a portion of the disk to enable recording/reproducing by a pickup unit, and to permit the pickup unit unobstructed access to the disk;

a linearly operated shutter for opening and closing the opening portion; and a shutter opening and shutting unit to open and shut the opening portion by interworking with a mounting unit of the disk cartridge 9, wherein the shutter opening and shutting unit comprises an elastic member for applying a force to the shutter so that the opening portion is opened; and an operating unit for fixing the shutter so that the shutter opening and shutting unit is maintained in a state of shutting the opening portion, and interworking with the mounting unit when being mounted at the mounting unit in order to release the shutter from the fixing state and move the shutter in an opening direction.

* * * * *